US006987738B2

(12) United States Patent
Subramanian et al.

(10) Patent No.: US 6,987,738 B2
(45) Date of Patent: Jan. 17, 2006

(54) METHOD FOR PACKET SCHEDULING AND RADIO RESOURCE ALLOCATION IN A WIRELESS COMMUNICATION SYSTEM

(75) Inventors: Vijay G. Subramanian, Chicago, IL (US); Rajeev Agarwal, Northbrook, IL (US); Richard J. La, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 896 days.

(21) Appl. No.: 09/759,846

(22) Filed: Jan. 12, 2001

(65) Prior Publication Data

US 2002/0147022 A1 Oct. 10, 2002

(51) Int. Cl.
*H04L 12/26* (2006.01)

(52) U.S. Cl. .................. 370/252; 370/328; 370/468

(58) Field of Classification Search ................ 370/318, 370/328, 342, 343, 345, 437, 468, 478, 479, 370/480, 498, 241, 252, 253, 230, 232, 389; 455/13.4, 450, 452.1, 452.2, 453, 522; 307/126
See application file for complete search history.

(56) References Cited

U.S. PATENT DOCUMENTS

| | | | |
|---|---|---|---|
| 5,923,650 A | | 7/1999 | Chen et al. |
| 6,069,883 A | * | 5/2000 | Ejzak et al. ................ 370/335 |
| 6,333,927 B1 | * | 12/2001 | Han ........................... 370/340 |
| 6,335,922 B1 | * | 1/2002 | Tiedemann et al. ......... 370/335 |
| 6,519,705 B1 | * | 2/2003 | Leung ......................... 713/300 |
| 6,567,387 B1 | * | 5/2003 | Dulin et al. ................. 370/329 |

FOREIGN PATENT DOCUMENTS

WO    WO 00 14900 A1    3/2000

OTHER PUBLICATIONS

"A Network-Assisted Dynamic Packet Assignment Algorithm for Wireless Data Networks" by Xiaoxin Qiu, Kapil Chawls, Justin Chuang and Nelson Sollenberger, AT&T Labs.
"Data Throughput of CDMA-HDR a High Efficiency-High Data Rate Personal Communication Wireless System" by A. Jalali, R. Padovani, and R. Panjak; Qualcomm Inc. IEEE 2000, pp. 1854-1858.
"CDMA Forward Link Waterfilling Power Control" by Jack M. Holtzman; Qualcomm Inc. IEEE 2000 pp. 1663-1667.

(Continued)

*Primary Examiner*—Chau Nguyen
*Assistant Examiner*—Joshua Kading
(74) *Attorney, Agent, or Firm*—Lalita W. Pace

(57) ABSTRACT

A method of performing packet level transmission scheduling in a communications systems including a plurality of cells, each cell including a base station and plurarity of mobile stations. The method performs scheduling while considering radio resource allocation at the wireless access node. In a schedule plan phase of the method, average power and average effective data rate are determined for all mobile stations in the system. In addition, the planned fractions of frames ρ that each mobile in the system will transmit is determined so that resources are allocated fairly. In the actual schedule phase of the method, current power and effective data rate values are compared to the average power values. This information along with the ρ values is used to determine the actual schedule of packet transmissions for all mobiles in a particular cell.

18 Claims, 4 Drawing Sheets

OTHER PUBLICATIONS

"Multiple Queue Scheduling over a Shared Time-Varying Channel" by Alexander Stolyar and Rajiv Vijayaykumar; Bell Labs and University of Michigan.

"Multiuser Diversity in Wireless Networks: Form Information Theory to Architecture" by David Tse. MIT EECS Colloquium, Nov. 2000.

Lu, Y. et al. "Unified Power Control, Error Correction Coding and Scheduling for a CDMA Downlink System." *Wireless Networks, ACM*; vol. 3, No. 1, Mar. 1997, pp. 83-90.

Garg, R. et al. "Fair Bandwidth Sharing Among Virtual Networks: a Capacity Resizing Approach." INFOCOM 2000 *Nineteenth Annual Joint Conference of the IEEE Computer and Communications Societies*; Mar. 2000, pp. 255-264.

Lu, S. et al. "Fair Scheduling in Wireless Packet Networks." *IEEE/ACM Transactions on Networking*; vol. 7, No. 4, Aug. 1999, pp. 473-489.

Eckerhardt, D. et al. "Effort-limited Fair (ELF) Scheduling for Wireless Networks." INFOCOM 2000 *Nineteenth Annual Joint Conference of the IEEE Computer and Communications Societies*; Mar. 2000, pp. 1097-1106.

Bhagwat, P. et al. "Enhancing Throughput over Wireless LANs Using Channel State Dependent Packet Scheduling." *INFOCOM 1996 Fifteenth Annual Joint Conference of the IEEE Computer Societies*; 1996, pp. 1133-1140.

* cited by examiner

METHOD FOR PACKET SCHEDULING AND RADIO RESOURCE ALLOCATION IN A WIRELESS COMMUNICATION SYSTEM

FIELD OF THE INVENTION

The present invention relates generally to communication systems and in particular to packet scheduling and radio-resource allocation in a wireless communication system.

BACKGROUND OF THE INVENTION

Efficient radio resource allocation is important in the design of wireless communication systems. As the number of multimedia sources being channeled through wireless systems increases, the demands palced on the wireless access node becomes incrisingly challenging. Currently, four traffic classes are defined for packetized service: controversional (e.g. throughput, delay, telephony) streaming (e.g. radio broadcast over the internet), interactive (e.g. web browsing) and background (e.g. email). Wireless systems are required to uphold stringent quality of service (QoS) requirements (e.g. throughput, delay, signal loss) despite the fact the wireless systems, packet-level limited compared to wireline channels. In wireless systems, packet-level scheduling and radio resource allocation can present problems in meeting QoS requirements for all users (mobile) in the system. Traditional wire-line schedulers such as first-come first serve (FCFS), priority queuing or weighted-fair-queuing (WFQ), are not aware of the radio conditions (e.g. channnel gain values) and thus making scheduling decisions without talking radio conditions into account. For example, if mobile A is transmitting on a strong channel and mobile B is transmitting on a weaker channel, traditional wire-line schedulers would not take this information into account. If instead, transmissions are prioritized based on channel conditions, it is possible to improve system throughput. Thus, utilizing a scheduler with knowledge of the radio conditions produces a more efficient system.

Efficency is not the only concern in a commercial system. The system must also be designed to ensure that resources are fairly arbitrated among the various mobiles so that each user can meet its QoS requirements. Some schedulers, that are cognizant of the channel conditions and that attempt to maximize efficiency while maintaining some degree of fairness in the arbitration of resources, have been proposed. However, none of the proposals provides a means to change the relative emphasis between system efficiency and fairness of allocation as the need arises.

Thus, there is a need for a systematic and flexible means to strike different trade-offs between system efficiency and fairness of allocation.

SUMMARY OF THE PREFERRED EMBODIMENT

Figure 1:
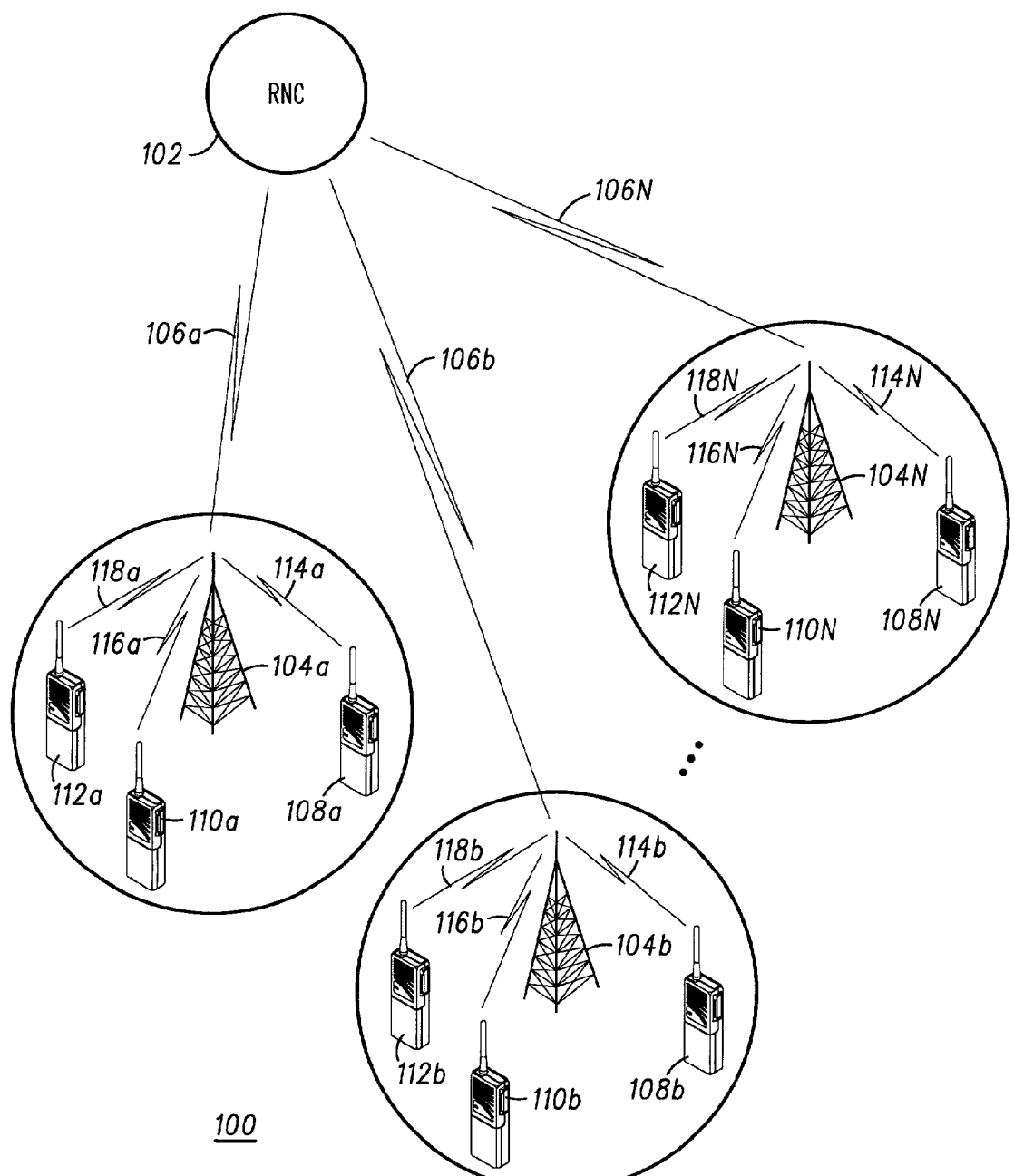
FIG. 1 is a block diagram of a communication system that can implement the preferred embodiment of the present invention.

The present invention provides in a communications system comprising a plurality of cells, each cell having a base station and a plurality of mobile stations, a method of scheduling packet transmission comprising the steps of: a) determining a nominal power level for all base stations in the system; b) determining an average effective data rate for all mobile stations in the system; c) using the transmit power level and average effective data rate to determine a tentative transmission schedule for each of the plurality of mobile stations in the system; and d) modifying the tentative transmission schedule using current radio conditions in a particular cell to determine an actual transmission schedule for each mobile station in the particular cell.

DESCRIPTION OF THE EMBODIMENT

The preferred embodiment of the present invention performs packet level transmission scheduling while considering radio resource allocation at the wireless access node. The invention offers gains over a scheduling scheme that is performed independent of radio resource allocation. Herein, the term scheduling includes determining power level allocations, data rate allocations and time allocation of resources. The scheduler of the present invention performs tasks on the packet level assuming that the admission control decisions at the call level have already been performed. The manner in which the date rate allocations are determined depends on the type of system that is employed. In a TDMA system, the date rate allocation is determined by adapting the modulation and coding scheme (MCS) and/or by accessing multiple time slots or carriers. In a CDMA system, on the other hand, the data rate allocation can be determined by adapting processing gains or spreading factors (SFs) can be determined by adapting precessing gains or spreading factors (SFs), adapting the MCS, adapting multiple spreading code allocations or a combination of the three. The present invention uses the radio condition information at two different time scales of resolution. At a slow time scale, in the schedule plan phase, allocations are made on a per cell basis of average radio conditions of all mobiles in the system. At a faster time scale, in the actual schedule phase, allocations are made on a per cell basis based on the current radio condition of each mobile in the cell. The frequency at which current radio conditions are updated depends on the rate at which feedback reports are generated in the system. When a report is desired for the downlink channel conditions, the scheduler, if located at the base station, sends a polling message to the mobile station in the system. The uplink channel conditions can be measured at the base station. If the scheduler is located at the radio network controller (RNC), the scheduler sends a polling message to the mobile stations for the downlink channel conditions and sends a polling message to the base station for the uplink channel conditions. The scheduler algorithm includes a parameter that represents the frequency at which reports are desired.

Referring to FIG. 1, a diagram of a communication system in accordance with the preferred embodiment of the present invention is shown. In the proffered embodiment, the communication system 100 includes an RNC 102 coupled to a first communication cell "a " including a first base station (BTS) $104_a$. The BTS $104_a$ is a coupled to the RNC 102 over a wireline connection $106_a$. Coupled to the first BTS $104_a$ are a plurality of mobile stations (MS) $108_a$, $110_a$, $112_a$. For simplicity of explanation, there MSs are shown. It should be recognized that the invention can be implemented using more than three MSs coupled to the $BTs_a$. The MSs $108_a$, $110_a$, $112_a$ are coupled to the BTS $104_a$ through wireless connections $114_a$, $116_a$, $118_a$. The RNC 102 is also coupled to a second communication cell "b" including a second base station (BTS) $104_a$ The BTS $104_b$ is coupled to the RNC 102 over a wireline connection $106_b$. Coupled to the second BTS $104_b$ are a plurality of MSs $108_b$, $110_b$, $112_b$. For simplicity of explanation, three MSs are shown. It should be recognize that the invention can be implemented using more than three MSs coupled to the $BTS_b$. In alternate embodiments, the RNC 102 can be coupled to a plurality of communication cells "N" as previously described. For simplicity of explanation, the invention will be described with respect to the RNC 102 coupled to a first communication cell "a" and a second communication cell "b." A BTS and MS that can be used with the present invention are available from Motorola, Inc. of Arligton Heights, Ill. An RNC that can be used with the present invention can be purchased from several sources, such as, Alcatel of France and Nortel of Dallas, Tex.

In the wireless communication system 100, traffic is transmitted between a BTS and a MS in the form of frames/packets. Because the resources in the system must be shared by many sources, the frames/packets to be transmitted by a MS are stored in a queue until the packet/frame is scheduled for transmission. A separate queue for each communication with the MSs $108_a$, $110_a$, $112_a$ receivers is maintained either at the BTS $104_a$ or at the RNC 102. Similarly, a separate queue for each communication with the MSs $108_b$, $110_b$, $112_b$ receivers is maintained at the $BTS_b$ or at the RNC 102. Similar queues exist at each of the MSs for each communication which they are the initiating agents. In the improved scheduling scheme of the present invention, the first step in determining the appropriate allocations is to determine a nominal channel power level and average effective data rate (e.g., using MCS and spreading gain) for the MSs $108_{a,b}$, $110_{a,b}$, $112_{a,b}$ in the system. The first step also includes determining the fraction time, $\rho$, each MS $108_{a,b}$, $110_{a,b}$, $112_{a,b}$ will transmit during a window, W. This step in the scheduling scheme is termed the schedule plan.

In a preferred embodiment, the window W is approximately 100 frames in length. The time-varying nature of the wireless channels are due it in part to fluctuations in the channel gains. The channel gains consist of distance based path loss, shadow fading and multipath fading. The choice of the decision time window separates the mobiles $108_{a,b}$, $110_{a,b}$, $112_{a,b}$ into roughly three classes:

(1) the fast class in which only the distance based path loss is fixed; (2) the medium class in which both the distance based path loss and shadow fading terms are fixed; and (3) the slow (static) class in which all three terms are fixed.

During the schedule plan phase average radio conditions (averaged over the decision time window W for each mobile $108_{a,b}$, $110_{a,b}$, $112_{a,b}$) are used to calculate a transmission allocation amongst the currently active mobiles $108_{a,b}$, $110_{a,b}$, $112_{a,b}$ to maximize net utility among a fixed set of base stations. The transmission allocations are then fine tuned during a subsequent time window in the actual schedule plan phase described later herein.

In the preferred embodiment, the schedule plan is implemented in the RNC 102. In alternate embodiments, the schedule plan can be implemented at the BTS $104_{a,b}$. The transmission allocations determined in the schedule plan are weights for a weighted-fair-queuing-type sharing of time, i.e., the percentage of time that transmission resources are occupied by a particular mobile $108_{a,b}$, $110_{a,b}$, $112_{a,b}$. The percentage of time is denoted by the quantity $\rho$ (see the Table below). This quantity assists in setting some fairness guarantees in that it ensures that each backlogged mobile uses the transmission resources for a certain amount of time over the decision time window. In a weighted-fair-queuing approach, resources are fairly arbitrated among the various mobiles so that each mobile can meet its QoS requirements. The schedule plan phase determines nominal power levels and $\rho$ values such that the sum total utility of all mobiles $108_{a,b}$, $110_{a,b}$, $112_{a,b}$ is maximized. The mathematical formulation described herein is for downlink transmissions. However, it should be recognized that the invention can also be used for uplink transmissions. The nominal power levels can be interpreted as being the maximum power level allowed or the average power level allowed —at each base station in the downlink and at each mobile on the uplink.

The parameters used in the mathematical calculations for the schedule plan are set forth in the Table below.

| Parameter | Description |
|---|---|
| b | Points to specific base stations |
| W | Schedule plan window in frames |
| $M_b$ | Number of frames assigned to traffic sources at base station b |
| $U_j(\cdot)$ | Utility function for user j |
| $G^d$ | Channel gain matrix with elements $G_{bj}$ which are channel gains from BTS b to MS j for the downlink |
| $G^u$ | Channel gain matrix with elements $G_{jb}$ which are channel gains from MS j to BTS b for the uplink |
| T | Gain matrix with elements $T_{ab}$, which are gains between base station a and b |
| $\sigma^2$ | Unaccounted for interference plus receiver noise variance |
| $\hat{R}_j$ | Effective data rate for user j given by the data rate or link adaptation algorithm and the frame error rate calculation |
| $\hat{R}_{j, avg}$ | Average effective data rate for user j |
| $P_b^{nom}$ | Nominal transmit power level for base station b |
| $C_j$ | number of channel and class based credits for each connection |
| $\tilde{W}_j$ | amount of normalized bytes transmitted for each connection during the scheduling window |
| $w_j$ | weight for the connection class (determined by QoS class) |
| Parameter (continued) | Description (continued) |
| $\beta$ | tunable control parameter used to determine the actual allocation of the available bandwidth capacity |
| $\gamma$ | tunable control parameter used to determine the actual allocation of the available bandwidth capacity |
| $\rho_j$ | Fraction of time the transmission resources are occupied by user j |

Figure 2:
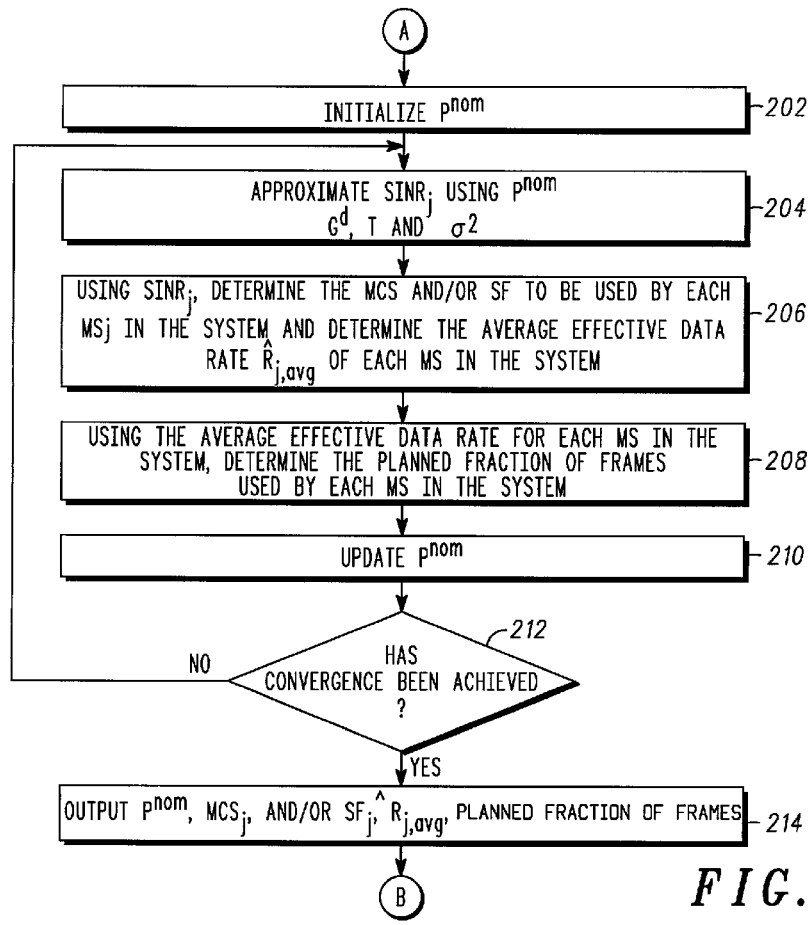
FIG. 2 is a flow chart of the tasks performed in the preferred embodiment of the schedule plan phase of the method of the present invention.

Referring to FIG. 2, a flowchart of the tasks performed in the schedule plan phase of the present invention are shown. In block 202, the power transmitted by each BTS in the system is given an initial value. An initial value used for the power transmitted by each BTS could be the maximum allowed by the system. In block 204, the initial power values along with the channel gain $G_{bj}$, interference channel gain $T_{ab}$, and receiver noise power plus unaccounted interference $\sigma^2$ are used to approximate the signal to interference plus noise ratio (SINR) for each mobile station j. The quantities $G_{bj}$, $T_{ab}$, and $\sigma^2$ are obtained by polling the transceivers at each MS and each BTS for a measurement report. In computing the SINR for each mobile station j, let $P^{nom}$ denote the vector of nominal powers at all of the base stations in the system. For example, $P_b^{nom}$ denotes the nominal power used at the base station b. Let $G_{bj}$ denote the energy gain from base station b to mobile station j. Let $T_{ab}$ denote the energy gain from base station a to base station b. Then the SINR at mobile station j can be approximated by $$SINR_j = \frac{P_b^{nom} G_{bj}}{\sum_{a \neq b} P_a^{nom} T_{ab} + \sigma^2} \quad (1)$$

In an alternate embodiment, more accurate formulae for SINR from known literature may be used. For instance, in the downlink $T_{ab}$ may be replaced by $G_{aj}$, the energy gain from base station a to mobile station j. In yet another alternate embodiment, the SINR may be obtained directly from measurement reports. The direct measurement approach is most useful when the nominal transmit power level is not varied.

In block 206, the $SINR_j$ is used to determine the modulation and coding scheme and/or spreading factor (SF) to be used by each MS $108_{a,b}$, $110_{a,b}$, $112_{a,b}$ in the system. The $SINR_j$ is then used to determine the average effective data rate $R_{j,avg}$ each MS $108_{a,b}$, $110_{a,b}$, $112_{a,b}$ in the system as follows. For each MCS and SF pair, there is a corresponding fixed data rate $R_j$. The $SINR_j$ is used to calculate the frame error rate ($FER_j$) for each MS $108_{a,b}$, $110_{a,b}$, $112_{a,b}$, wherein the $FER_j$ is a function of the $SINR_j$, the $MCS_j$ and the SF. The effective data rate can be expressed as:

$$R_j = R_j(1 - FER_j) =: \Gamma_j(SINR_j). \quad (2)$$

Figure 3:
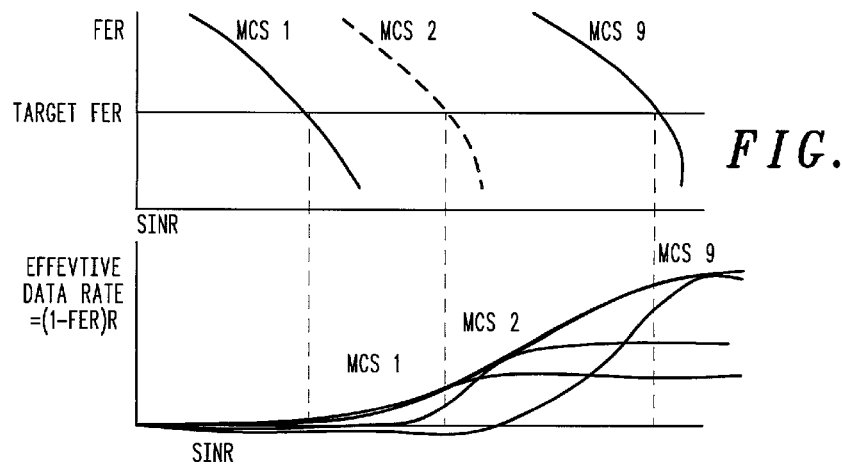
FIG. 3 is a plot of curves used by a link adaptation algorithm that can be used in the preferred embodiment of the scheduling algorithm of the present invention.

Referring to FIG. 3, curves used for one link adaptation algorithm in determining the quantities in block 206 (FIG. 2) are shown. In the preferred embodiment, curves for a TDMA EDGE system are utilized. The upper portion of FIG. 3 shows FER vs. SINR curves for modulation and coding schemes MCS 1, MCS 2 and MCS 9. The lower portion of FIG. 3 plots the effective data rate (throughput), (1-FER)*R, for each of the MCSs shown in the upper portion of the figure. As previously mentioned, the data rate R is a known quantity for each MCS. In the link adaptation algorithm, for each value of SINR calculated in block 204 (FIG. 2), the algorithm identifies potential MCSs whose FER (at that SINR value) is at most the target FER in the upper portion of FIG. 3. Then, among the potential MCSs identified, in the bottom half of FIG. 3, the algorithm chooses the MCS with the highest effective data rate. The corresponding effective data rate is recorded in the bold curve and gives the SINR →Effective data rate mapping $R_j = R_j(1 - FER_j) =: \Gamma_j(SINR_j)$ of equation (2) above.

An example for a TDMA system has been described. A similar scheme can be used for a CDMA system. In the case of a CDMA system there would be similar performance curves except indexed by the spreading factor and the MCS. The definition of the effective rate remains the same.

The average effective data rate $R_{j,avg}$ is used in block 208 to produce the planned fraction of frames $\rho_j$ to be used by each MS $108_{a,b}$, $110_{a,b}$, $112_{a,b}$ and the corresponding throughput equals $\rho_j R_{j,avg}$. The values are obtained as a solution to the optimisation problem:

$$\max_{\rho_j} \sum_{j \in J_b} U_j(\rho_j \hat{R}_{j,avg})$$

subject to $$\sum_{j \in J_b} \rho_j = M_b$$

$$\rho_j \geq 0$$

In the preferred embodiment the utility function is $$U_j(x) = \begin{cases} x^\alpha, & \alpha < 1, \alpha \neq 0 \\ \log(x), & \alpha = 0 \end{cases} \quad (3)$$

For this utility function, the planned fraction of frames, $\rho_j$, is given by the equation $$\rho_j = \frac{(\hat{R}_{j,avg})^{\frac{\alpha}{1-\alpha}}}{\sum_{j \in J_b} (\hat{R}_{j,avg})^{\frac{\alpha}{1-\alpha}}} M_b \propto (\hat{R}_{j,avg})^{\frac{\alpha}{1-\alpha}}. \quad (4)$$

Note that if $\alpha$ is greater than zero, the allocation favors users with higher rates, i.e., the user with a higher rate gets a higher fraction of frames allocated to it. The parameter $\alpha$ controls the extent to which this bias is enforced. A value of $\alpha$ equal to 1 leads to an efficiency only solution with all slots allocated to the users with the highest data rates. A value of $\alpha$ close to $\alpha$ close to $-\infty$ yields a fairness only solution. A value of $\alpha$ equal to 0 is equivalent to using a logarithmic utility function and yields a proportionally fair solution. The throughput for this example is then given by:

$$throughput_j = \rho_j \hat{R}_{j,avg} \propto \hat{R}_{j,avg}^{\frac{1}{1-\alpha}} = \hat{R}_{j,avg}^\beta \text{ where } \beta = \frac{1}{1-\alpha}. \quad (5)$$

The $\rho_j$ values along with the effective data rate are used to determine the frame credits available to each MS $108_{a,b}$, $110_{a,b}$, $112_{a,b}$. The frame credit value is the number of bits to be transmitted over a window W. The frame credit value is used in the actual schedule phase to ensure that no MS $108_{a,b}$, $110_{a,b}$, $112_{a,b}$ is allocated an inordinate share of the resources. Once the $\rho_j$ values and average effective data rate $R_{j,avg}$ values are known, $P^{nom}$ is updated (block 210) and the algorithm loops through blocks 204, 206 and 208 until convergence is achieved (decision block 212). Once convergence is achieved, the algorithm outputs $P^{nom}$, the $MCS_j$ and/or $SF_j$, $R_{j,avg}$, and $\rho_j$. The algorithm in the schedule plan can also be used to calculate the nominal power levels only. In such a case, the schedule plan algorithm is referred to as the nominal power allocation algorithm.

In the actual schedule phase of the preferred embodiment of the scheduling algorithm of the present invention, the allocation quantities are suitably modified on the basis of current radio conditions. The current radio conditions are preferably available from the periodic feedback reports. The current radio conditions can also be available through some other mechanism such as pilot measurements in a CDMA-based system. Specifically, in the actual schedule phase, the nominal values of power levels $P^{nom}$, average effective data rate $R_{j,avg}$, along with the planned fraction of frames $\rho_j$ and current measurement reports are used to determine the actual schedule for mobile station transmission in particular cell a or b. Note here, that whereas in the schedule plan average values (power, effective data rate, etc.) were determined for all MSs in the system, in the actual schedule, current values (power, effective data rate, etc.) are used to determine the transmission schedule on a per cell basis. Specifically, current values are compared to average values in determining the order in which MSs $108_a$, $110_a$, $112_a$ or $108_b$, $110_b$, $112_b$ will transmit. The goal of the actual schedule is to give an advantage to the MSs among 108, 110, 112 with good channel conditions to maximize efficiency, while factoring in the schedule plan to ensure that the transmission channel is shared in the fair manner. Users can be prioritized based on many factors. For example, priority can be based on relative channel gains, relative signal-to-interface levels (relative to average conditions under which the schedule plan calculation were made) absolute channel gains, absolute signal-to-interference level or some levels combinations of these quantities.

In the actual schedule phase, the transmit power levels are adjusted based on current conditions at both the BTS (in the current example BTS $104_a$) transmitter and all the MSs $108_a$, $110_a$, $112_a$ receivers communicating with the BTS $104_a$. A first embodiment of the actual schedule (FIG. 4) is a credit-based implementation of weighted-fair-queuing. The implementation is credit-based because it allocates the available bandwidth capacity to users based on credits. The algorithm uses quantities $\overline{W}_j$, $C_j$, $w_j$, $R_{j,avg}$ and R defined for each connection and numbers $\beta(\beta>0)$ and $\gamma(0<\gamma<1)$. The quantities $w_j$, $R_{j,avg}$ and $R_j$ are the weight for the connection class (determined by QoS class), average effective data rate (calculated using current channel conditions), respectively. The quality $C_j$ is the number of channel and class based credits for each connection and is defined by the equation:

$$C_j = w_j \hat{R}_{j,avg}^{\beta} \left(\frac{\hat{R}_j}{\hat{R}_{j,avg}}\right)^{\gamma}. \tag{6}$$

The quantity $\overline{W}_j$ is the amount of normalized bytes transmitted for each connection during the scheduling window, and for each connection, $\overline{W}_j$ is reset to zero at the beginning of each window. Numbers $\beta$ and $\gamma$ are tunable control parameters used in equation (6) to determine the actual allocation of the available bandwidth capacity. The choice for the value of $\beta$ depends on the utility function chosen. $\beta$ is used to enforce to what extent efficiency, i.e., total throughput, is sacrificed in favor of fairness. Control parameter $\gamma$ is used to determine how much emphasis should be placed on the current value of the effective data rate when computing the credits of the users. For example, if $\gamma$ is set to zero, only the average value of the effective data rate is used in computing the credit. The value of $\gamma$ should depend on how accurate or reliable the current effective data rates are. The purpose of $\gamma$ is to take advantage of the fast measurement reports if available and improve the total throughput by serving the users with better current radio conditions first. The actual schedule algorithm gives a MS connection a throughput that is proportional to its credit subject to various constraints and bottlenecks. The algorithm also prioritizes users based on their current effective data rate relative to their average effective data rates. Every time a packet is removed from a user queue, $\overline{W}$ is updated using the equation:

$$\overline{W}_j = \overline{W}_j + \left(\frac{\text{number of bytes received}_j}{C_j}\right) \tag{7}$$

The algorithm attempts to keep $\overline{W}_j$ roughly equal for all users by selecting MS $108_a$, $110_a$, $112_a$ with the lowest $\overline{W}_j$ for transmission in each frame provided they are allowed to transmit and have data to transmit. New users are assigned a $\overline{W}_j$ value based on the $\overline{W}_j$ values of the already present users, their QoS class, and amount of data to be transferred.

Figure 4:
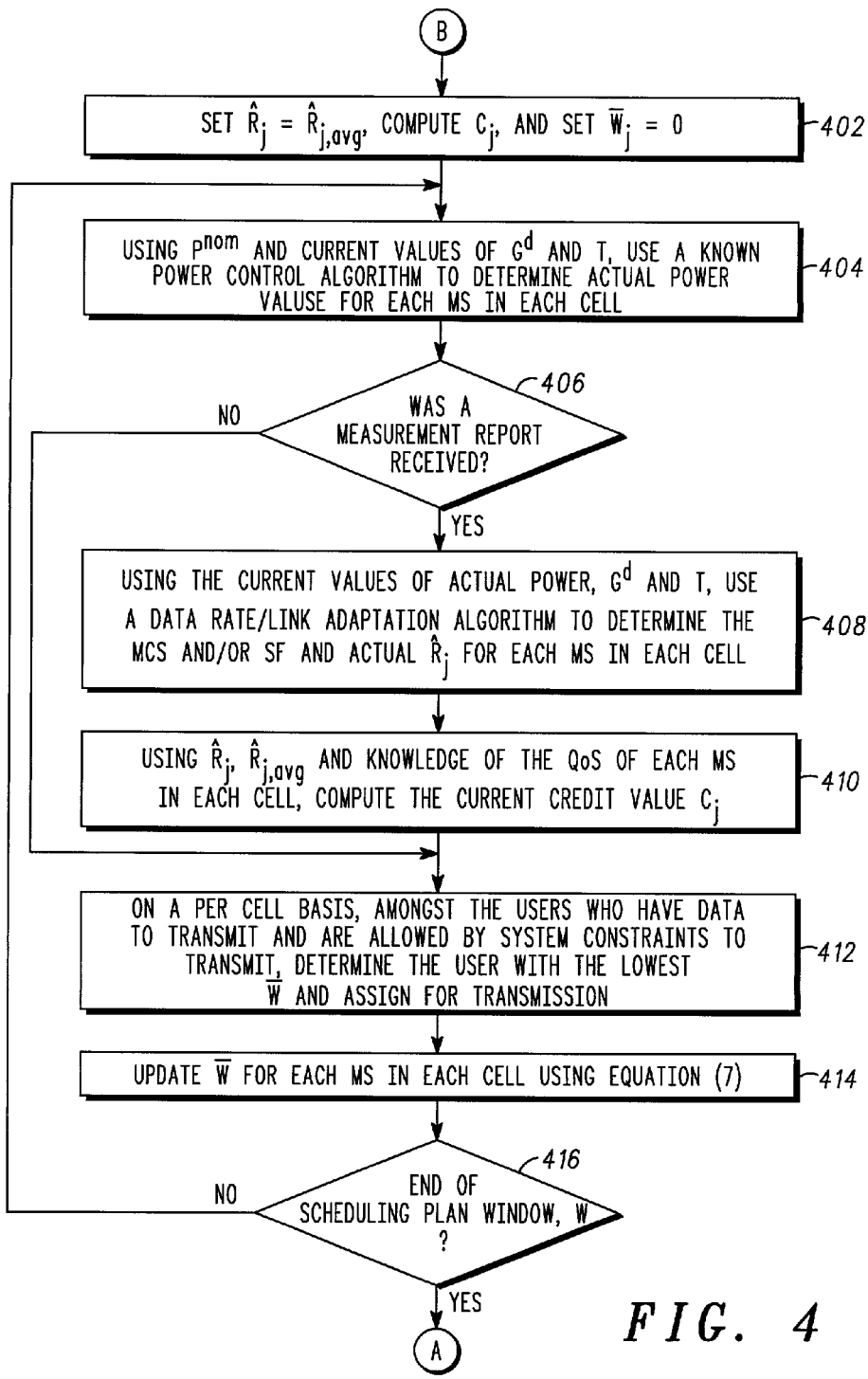
FIG. 4 is a flow chart of the tasks performed in a first embodiment of the actual schedule phase of the method of the present invention.

FIG. 4 is a flow chart of the first embodiment of the actual schedule algorithm described above. In block 402, the actual effective data rate $R_j$ is set equal to the average effective data rate $R_{j,avg}$ calculated in the schedule plan. In addition, the credit value $C_j$ is calculated (using equation (6)) and the amount of normalized bytes transmitted for each connection $W_j$ is set to zero. In block 404, $P^{nom}$ output in block 214 of FIG. 2 is used along with current values of gain and interference terms in a known power control algorithm to determine actual power values for each MS $108_a$ $110_a$ $112_a$ in each cell. Next, in decision block 406, the algorithm determines whether a measurement report was received. If a measurement report was received, current values of actual power, gain and interference terms are used in a data rate/link adaptation algorithm to determine the MCS and/or SF and $R_j$ for each MS $108_a$ $110_a$ $112_a$ in each cell (block 408). Next, in block 410, the current credit value $C_j$ is computed using $R_j$, $R_{j,avg}$ and the knowledge of the QoS of each MS $108_a$ $110_a$ $112_a$ in each cell. In block 412, on a per cell basis, amongst the users who have data to transmit and are allowed by system constraints to transmit, the user with the lowest $\overline{W}_j$ is determined and assigned for transmission. If a measurement report was not received in decision block 406, the algorithm skips blocks 408 and 410 and proceeds with block 412. Next, in block 414, $\overline{W}_j$ is updated for each MS $108_a$ $110_a$ $112_a$ in each cell using equation (7). In decision block 416, the algorithm determines if it has reached the end of the scheduling plan window. If the end has not been reached, the algorithm loops back through the process beginning with block 404. If the end has been reached, the algorithm proceeds to the schedule plan phase beginning with block 202.

Figure 5:
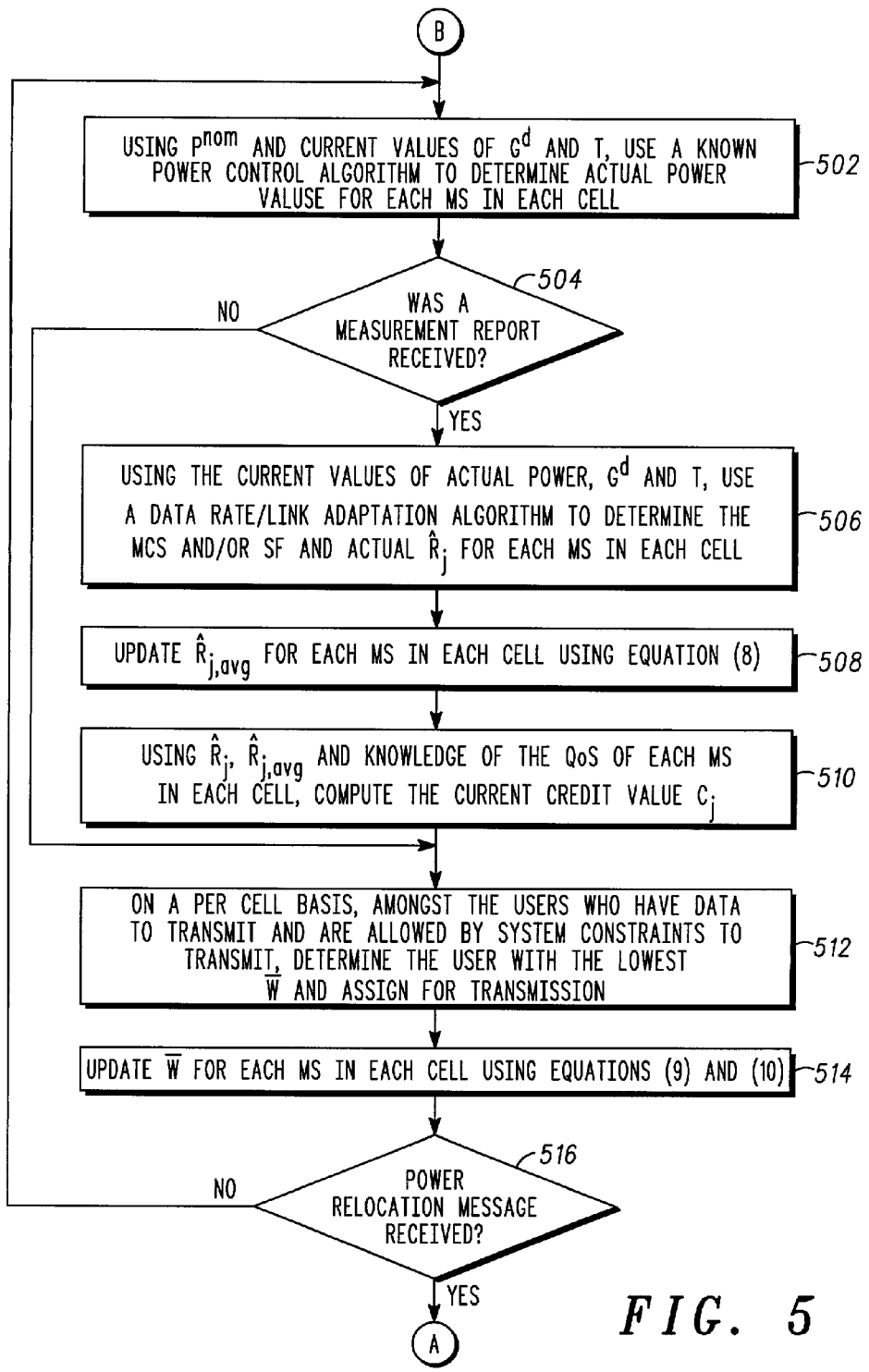
FIG. 5 is a flow chart of the tasks performed in an alternate embodiment of the actual schedule phase of the method of the present invention.

An alternate embodiment of the actual plan, shown in the flow chart of FIG. 5, is a distributed and asynchronous implementation of the algorithm. The power allocation part of the schedule plan is used whenever there is power reallocation message generated by the RNC 102. The asynchronous implementation implicitly uses the decision window concept by computing the $\overline{W}$ and $R_{j\ avg}$ based on exponential averaging:

$$R_{j,avg}^{new} = (1-\tau) \cdot R_{j,avg}^{old} + \tau \cdot R_j \tag{8}$$

where $\tau$ is an appropriate discount factor. At the beginning of each frame, the algorithm updates $\overline{W}$ according to:

$$\overline{W} = (1-\phi) \cdot \overline{W} \tag{9}$$

where $0 < \phi \leq 1$ and $1-\phi$ is a discount factor used as commonly in the art to keep $\overline{W}$ from continuously increasing with time. After serving a user in each time slot, the algorithm updates $\overline{W}_j$ of the user that was just served as follows:

$$\overline{W}_j = \overline{W}_j + \phi \cdot \frac{\text{number of bytes transmitted}_j}{C_j} \quad (10)$$

where $\phi$ is an additional normalizing factor that scales the numerical value of $\overline{W}_j$ appropriately. As per the previous embodiment $$C_j = w_j \hat{R}_{j,avg}^\beta \left( \frac{\hat{R}_j}{\hat{R}_{j,avg}} \right)^\gamma,$$

the actual schedule chooses the MS $108_a$ $110_a$ $112_a$ with the smallest $\overline{W}_j$ for transmission in each frame provided they are allowed to transmit and have data to transmit.

FIG. 5 is a flow chart of the alternate embodiment of the actual schedule algorithm described above. In block 502, $P^{nom}$ output in block 214 of FIG. 2 is used along with current values of gain and interference terms in a known power control algorithm to determine actual power values for each MS $108_a$ $110_a$ $112_a$ in each cell. Next, in decision block 504, the algorithm determines whether or not a measurement report was received. If a measurement report was received, current values of actual power, gain and interference terms are used in a data rate/link adaptation algorithm to determine the MCS and/or SF and for each MS $108_a$ $110_a$ $112_a$ in each cell (block 506). Next, in block 508, $R_{j,avg}$ is updated for each MS $108_a$ $110_a$ $112_a$ in each cell using equation (8). In block 510, the current credit value $C_j$ is computed using $R_j$, $R_{j,avg}$ and the knowledge of the QoS of each MS $108_a$ $110_a$ $112_a$ in each cell. In block 512, on a per cell basis, amongst the users who have data to transmit and are allowed by system constraints to transmit, the user with the lowest $\overline{W}_j$ is determined and assigned for transmission. If a measurement report was not received in decision block 504, the algorithm skips blocks 506, 508 and 510 and proceeds with block 512. Next, in block 514, $\overline{W}_j$ is updated for each MS $108_a$ $110_a$ $112_a$ in each cell using equations (9) and (10). In decision block 516, the algorithm determines whether or not a power reallocation message was received. If a power reallocation message is received, the schedule plan algorithm is repeated to recalculate $P^{nom}$ (FIG. 2, block 202). If a power reallocation message is not received, the algorithm loops back through the process beginning with block 502.

In a second alternate embodiment, the packet scheduler uses the relative effective rate compared to the average rate calculated in the schedule plan phase to prioritize the mobiles 108, 110, 112. The mobiles 108, 110, 112 are allowed to transmit according to their priorities (which can change as frequently as the current channel information is available) subject to their having bit credits and non-zero queue lengths (i.e., frames stored in their respective queue). In this embodiment, the credits are defines as $C_j = w_j R_{j,avg}^{62}$ and the user with the smallest $$\overline{W}_j \left( \frac{\hat{R}_{j,avg}}{\hat{R}_j} \right)^\gamma$$

s chosen for transmission in each frame provided that the user is allowed to transmit and has data to transmit. The update of $\overline{W}_j$ is performed using either equation (7) or equations (9) and (10). In the latter case, $R_{j,avg}$ is computed using equation (8). In other (no less preferred) embodiments, any of the other parameters or a combination of the parameters can be used to determine the transmission priorities.

The schemes described above are for a TDMA system. For a CDMA system, the sorted list (increasing order) of $\overline{W}_j$ s provides the order in which users are to be chosen for transmission during the current frame. The exact list of users who transmit during the current frame would be determined according to the following steps:

1. For the first user, if there is no data, skip to step 3. If there is data to transmit, then label the user as the current user and proceed with step 2.
2. For the current user, transmit the maximum amount of data that the system resources (power budget remaining, code resources remaining, etc.) allow. Proceed to next step.
3. If all users in the cell are exhausted, then exit. Determine whether the next user on the ordered list has data to transmit. If so, label the user as the current user and go to step 2. If the next user on the ordered list does not have data to transmit, repeat this step 3.

Those skilled in the art will recognize that various modifications and variations can be made in the apparatus of the present invention and in construction of this apparatus without departing from the scope or spirit of this invention. For example, the method of the present invention can be implemented in a communications system that includes more than two base stations.

What is claimed is:

1. In a communications system comprising a plurality of cells, each cell having a base station and a plurality of mobile stations, a method of scheduling packet transmission comprising:
   a) determining a nominal power level for all base stations in the system;
   b) determining an average effective data rate for all mobile stations in the system;
   c) using the nominal power level and average effective data rate to determine a tentative transmission schedule for each of the plurality of mobile stations in the system;
   d) determining an actual power value for each of the plurality of mobile stations in a particular cell;
   e) determining an actual effective data rate for each of the plurality of mobile stations in the cell;
   f) determining a present credit value for each of the plurality of mobile stations in the cell;
   g) determining which mobile station of the plurality of mobile stations has a lowest amount of normalized bytes transmitted, wherein normalized bytes transmitted is calculated as a function of the present credit value for each of the plurality of mobile stations in the cell; and
   h) scheduling for transmission, the mobile station with the lowest amount of normalized bytes transmitted.

2. The method of claim 1 wherein step b) comprises the steps of:
   i) approximating a signal to interference plus noise ratio (SINR) for each of the plurality of mobile stations in the system;
   ii) using the SINR to determine at least one of a modulation and coding scheme, a spreading factor and an effective data rate for each of the plurality of mobile stations in the system; and
   iii) using the effective data rate to determine the average effective data rate for all mobile stations in the system.

3. The method of claim 2 wherein the step of approximating the SINR comprises using the nominal power level, a present gain, a present interference channel gain and receiver noise power plus unaccounted interference terms.

4. The method of claim 3 wherein the present gain, the present interference channel gain and receiver noise power plus unaccounted interference terms are obtained by polling transceivers at each of the plurality of mobile stations and the base station for a measurement report.

5. The method of claim 2 wherein the step of approximating the SINR comprises obtaining the SINR from a measurement report.

6. The method of claim 2 wherein step ii) comprises using a plot of signal to interference plus noise ratio vs. FER to determine the modulation and coding scheme.

7. The method of claim 6 further comprising using a plot of signal to interference plus noise ratio vs. effective data rate and the modulation and coding scheme to determine the effective data rate for each mobile station in the system.

8. The method of claim 1 wherein step c) further comprises using the average effective data rate to determine a planned fraction of frames to be used by each of the plurality of mobile stations in the system.

9. The method of claim 1 wherein step d) comprises using the nominal power level and present values of gain and interference terms in a power control algorithm to determine the actual power value.

10. The method of claim 1 wherein step e) comprises using the nominal power level and present values of gain and interference terms in a link data rate adaptation algorithm to determine the actual effective data rate.

11. The method of claim 1 wherein step f) comprises using the actual effective date rate, the average effective data rate and a quality of service of each mobile station of the plurality of mobile stations in the cell to compute the present credit value of each of the plurality of mobile stations.

12. The method of claim 1 further comprising the step of updating the amount of normalized bytes for each mobile station in the cell.

13. The method of claim 1 further comprising the steps of:
   i) when system resources have not been exhausted, scheduling for transmission, the mobile station with a next lowest amount of normalized bytes transmitted; and
   j) repeating step i) until system resources are exhausted.

14. The method of claim 1 wherein the average effective data rate in step b) is defined as $R_{j,avg}^{new}$ and is calculated as $$\overline{R}_{j,avg}^{new} = (1-\tau) \cdot R_{j,avg}^{old} + \tau \cdot R_j,$$

wherein $\tau$ is an exponential filter coefficient and $\tau(0 \leq \tau \leq 1)$, $R_j$ is a present actual effective date rate and $R_{j,avg}^{old}$ is a previous average effective data rate.

15. The method of claim 1 wherein the present credit value in step f) is defined as $C_j$ and is calculated as $$C_j = w_j \hat{R}_{j,avg}^{\beta} \left( \frac{\hat{R}_j}{\hat{R}_{j,avg}} \right)^{\gamma},$$

wherein $w_j$ is a QoS weight, $R_{j,avg}$ is an average effective date rate, $R_j$ is a present actual effective date rate, $\beta$ is a first fairness parameter and $\gamma$ is a second fairness parameter.

16. The method of claim 1, wherein step g) comprises:
for the plurality of mobile stations, determining an amount of normalized bytes to transmit at a beginning of a scheduling interval by
updating a quantity $\overline{W}_j$ a first time using $$\overline{W}_j = \overline{W}_j + \phi \cdot \frac{\text{number of bytes transmitted}_j}{C_j};$$

updating quantity $\overline{W}_j$ a second time using $\overline{W}_j = (1-\phi) \cdot \overline{W}_j$;

calculating the normalized bytes to transmit as $\overline{W}_j$; and sorting the normalized bytes, $\overline{W}_j$, to determine which mobile station of the plurality of mobile stations has the lowest amount of normalized bytes transmitted;
wherein $\phi$ is a discount factor and $C_j$ is the present credit value.

17. The method of claim 1 wherein the present credit value in step f) is defined as $C_j$ and is calculated as $C_j = w_j R_{j,avg}^{\beta}$, wherein $w_j$ is a QoS weight, $R_{j,avg}$ is an average effective date rate, and $\beta$ is a fairness parameter.

18. The method of claim 1, wherein step g) comprises:
for the plurality of mobile stations, determining an amount of normalized bytes to transmit at a beginning of a scheduling interval by
updating a quantity $\overline{W}_j$ a first time using $$\overline{W}_j = \overline{W}_j + \phi \cdot \frac{\text{number of bytes transmitted}_j}{C_j}$$

updating quantity $\overline{W}_j$ a second time using $\overline{W}_j = (1-\phi) \cdot \overline{W}_j$;

calculating the normalized bytes to transmit as $$\overline{W}_j \left( \frac{\hat{R}_{j,avg}}{\hat{R}_j} \right)^{\gamma};$$

and
sorting the normalized bytes to determine which mobile station of the plurality of mobile stations has the lowest amount of normalized bytes transmitted
wherein $\phi$ is a discount factor, $C_j$ is the present credit value, $R_{j,avg}$ is an average effective date rate, $R_j$ is a present actual effective date rate and $\gamma$ is a fairness parameter.

* * * * *